Figures 1, 2, 3:
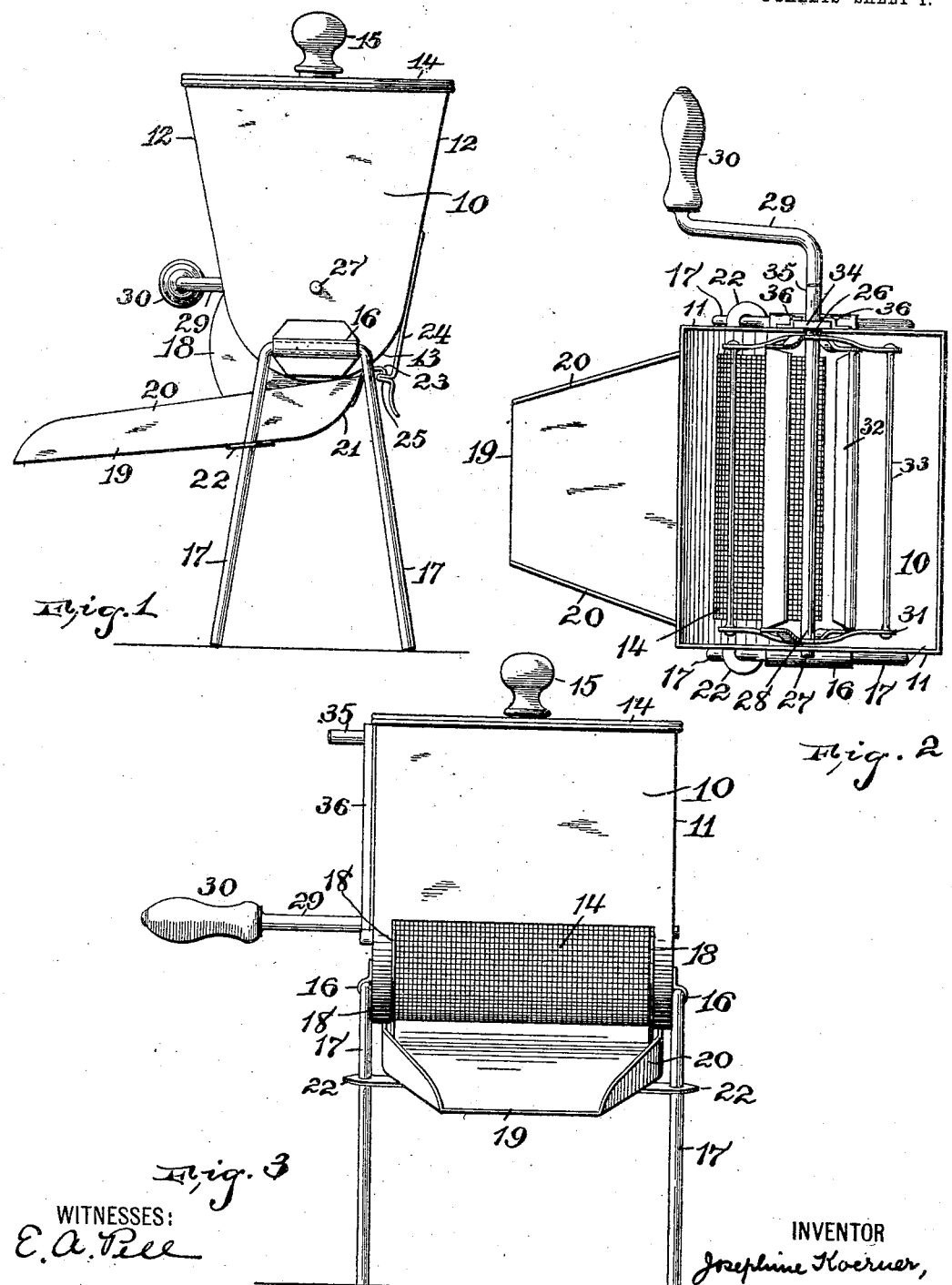

J. KOERNER.
FRUIT AND VEGETABLE MILL.
APPLICATION FILED APR. 1, 1909.

930,194.

Patented Aug. 3, 1909.
2 SHEETS—SHEET 1.

WITNESSES:
E. A. Pell
M. A. Johnson

INVENTOR
Josephine Koerner,
BY
Wm. H. Canfield
ATTORNEYS

J. KOERNER.
FRUIT AND VEGETABLE MILL.
APPLICATION FILED APR. 1, 1909.
930,194.
Patented Aug. 3, 1909.
2 SHEETS—SHEET 2.
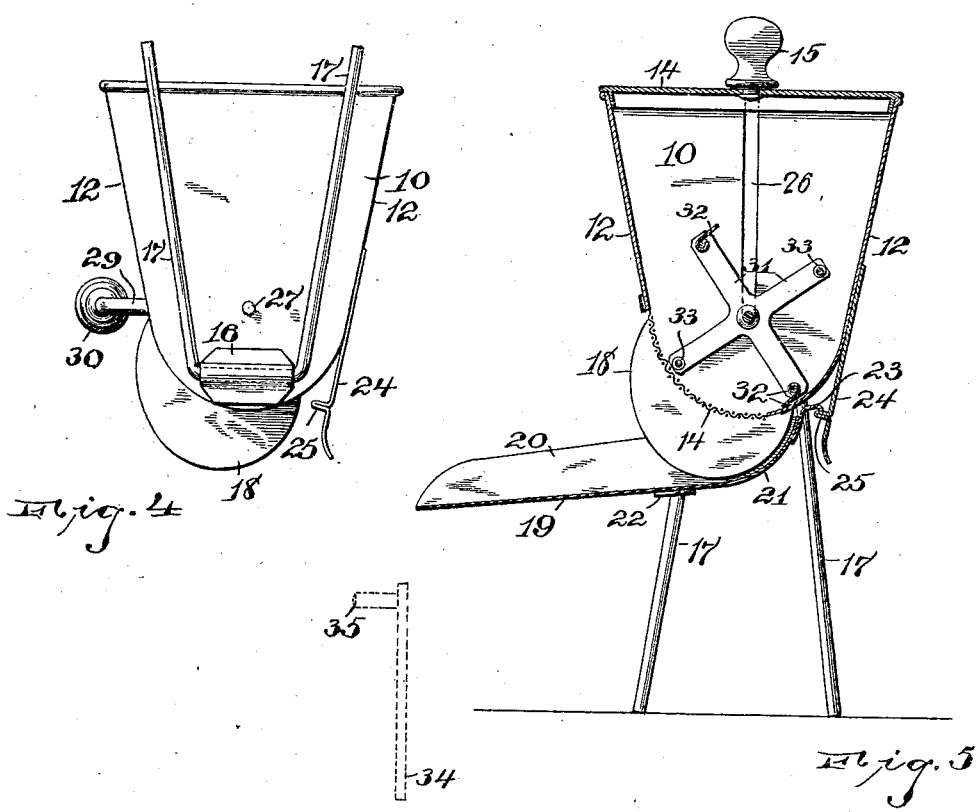
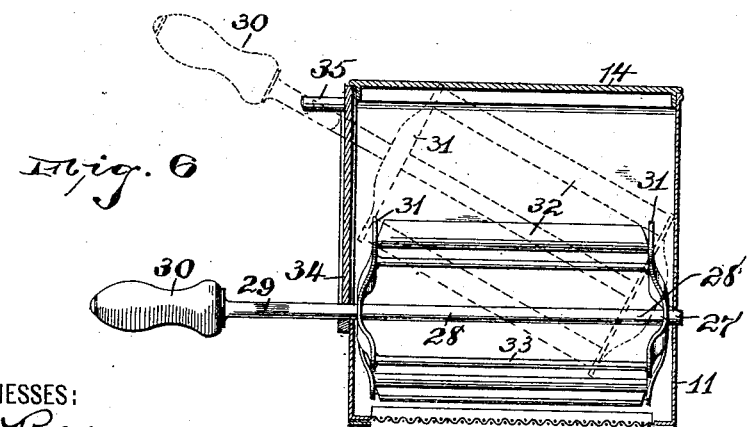
WITNESSES:
E. A. Pell
M. A. Johnson
INVENTOR
Josephine Koerner,
BY
Wm. H. Caufield.
ATTORNEYS

UNITED STATES PATENT OFFICE.

JOSEPHINE KOERNER, OF IRVINGTON, NEW JERSEY.

FRUIT AND VEGETABLE MILL.

No. 930,194.      Specification of Letters Patent.      Patented Aug. 3, 1909.

Application filed April 1, 1909. Serial No. 487,117.

*To all whom it may concern:*

Be it known that I, JOSEPHINE KOERNER, a citizen of the United States, residing at Irvington, in the county of Essex and State of New Jersey, have invented certain new and useful Improvements in Fruit and Vegetable Mills; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to an improved mill, and is particularly designed to form an apparatus for squeezing fruit and vegetables so as to get the juice therefrom and, if necessary, the pulp, leaving any seeds or skins behind.

The device is particularly adapted for making jams, jellies, catsup and similar food products.

The device is designed to provide a structure that can be folded to take up a small space when not in use, and also one that can be easily dismantled for cleaning and just as quickly reassembled for use.

The invention is illustrated in the accompanying drawings, in which—

Figure 1 is a side view of the structure, and Fig. 2 is a plan with the lid removed. Fig. 3 is a front view of the same. Fig. 4 is a view with the spout or tray removed showing the supporting legs folded up against the body portion. Fig. 5 is a transverse section of the complete structure, and Fig. 6 is a longitudinal central section of the body portion showing in dotted outline the method of dismantling the same.

The invention consists of a body portion 10, the ends of which are preferably flat, being also perpendicular as at 11 and having the inclined front and back portions 12 merging into a rounded bottom 13. A lid 14 on the handle 15 is adapted to close the top of the body portion to prevent the spilling of any of the contents when a liquid or semi-liquid is being agitated within the body portion. The rounded bottom 13 is provided with a screen 14 which can be arranged entirely on the bottom, but is preferably arranged as shown in Figs. 3 and 5, extending from near the center of the bottom part way up the front. Ears 16 are secured to the sides of the body portion near the bottom and form pivotal supports for the approximately U-shaped pieces forming supporting legs 17 which, when they are extended downward, support the device as shown in Figs. 1 and 5, but which can be swung upward as shown in Fig. 4 when it is desired to pack the device in a small place. To prevent the escape of any liquid or semi-liquid coming from the screen, and insuring its direction, the screen is flanked by shields 18 as shown in Figs. 1, 3 and 5. A spout or tray 19, with the raised sides 20, is placed so that these raised sides come outside of the shields 18, the back of the tray being rounded as at 21 and having the ears 22 on either side, the ears 22 being perforated and receiving one of the legs 17 on each side of the body portion, as will be seen more particularly from Fig. 3. These ears keep the spout central and also prevent the spreading of the legs so that the device will not accidentally collapse. The tray is held in position by means of having a finger 23 projecting from the back thereof and having a manually operated spring 24 with a lip 25 thereon holding the tray up.

One end of the body portion is slitted as at 26, the slot extending from the top with its bottom in line with the perforation through which the end 27 of the shaft 28 extends. The shaft 28 is bent at 29 into a crank and has a handle 30 on the end thereof for its manual manipulation. The shaft has, on its ends, the spiders or plates 31 having the agitators or compressing blades 32 thereon, these blades being preferably arranged as shown in Fig. 5, exerting a pressure to squeeze the contents of the body portion against the screen rather than to cut. The blades 32 are mounted on rods 33 that connect the spiders or end plates 31, the blades being placed on all the rods, or some of the rods can be left bare so as to alternately squeeze or mix up the contents of the body portion.

When the apparatus is to be cleaned the shaft and its agitating device can be lifted out as shown in dotted outline in Fig. 6, and when in place the shaft is held down and material is held from escaping from the body portion by the bar 34 having the pin 35 for its manual manipulation, the bar 34 sliding down in ways formed by the strips 36. The bar 34 is withdrawn, as shown in dotted outline in Fig. 6, when the handle and the agitator are to be taken from the body portion. The device can receive fruit or vegetables and the liquid matter can be drained off first, that is, in the case of fruit the juice will be allowed to pass down through the screen and be guided by the tray or spout into a receptacle to form a jelly, and when sufficient has been withdrawn therefrom the handle 30 can be turned to force the pulp through the screen in the body portion and preserves can then be made therefrom, the screen acting to cause any pits or skins to be left in the body portion.

This device forms a handy kitchen utensil and is positive, at the same time being extremely simple in construction and being adapted to be folded away in a small space.

Having thus described my invention, what I claim is:—

1. A mill comprising a body portion, a rotatable agitator therein, a handle on the agitator, legs adapted to lie against the body portion or project therefrom, a spout arranged to be slid on the legs to hold them in their projected position, and means for holding the spout.

2. A mill comprising a body portion with a rounded bottom having a screen therein, an agitator in said body portion having blades, a shaft on the agitator and adapted to have its end seated in one end of the body portion, the other end of the body portion being slotted to permit the shaft being raised and lowered from that end, a handle on the vertically movable end of the shaft, a bar sliding in ways on the body portion to close the slot and seat the shaft when it is in place, and a lid on the body portion to close it and rest on the bar to lock it in position.

3. A mill comprising a body portion having a rounded bottom, a pair of legs arranged to swing on each side of the body portion to lie against or to project therefrom, a spout adapted to slide on the legs, and co-acting means on the spout and the body portion to hold the spout in position.

4. A mill comprising a body portion having a rounded bottom, a U-shaped wire pivotally mounted on each end of the body portion to form legs adapted to lie against the body portion or project therefrom, a tray having ears to receive one of the legs of each U-shaped wire to hold them in place, and co-acting means on the tray and the body portion to lock the tray in position.

5. A mill comprising a body portion having a rounded bottom, a U-shaped wire pivotally mounted on each end of the body portion to form legs adapted to lie against the body portion or project therefrom, a tray having ears to receive one of the legs of each U-shaped wire to hold them in place, a finger on the tray, and a spring having a lip thereon for engaging the finger to lock the tray in position.

6. A mill comprising a body portion having a rounded bottom, a screen in the bottom, a shaft mounted in the body portion, end plates on the shaft, blades mounted between the end plates to obliquely engage the screen to give a squeezing motion to anything on the screen, shields projecting from each side of the screen, legs on the body portion, a tray adapted to slide on the legs and inclose the shields, and means on the tray and body portion for locking the tray in position.

In testimony, that I claim the foregoing, I have hereunto set my hand this 31st day of March, 1909.

JOSEPHINE KOERNER.

Witnesses:
E. A. PELL,
WM. H. CAMFIELD.